United States Patent [19]

Meistrell

[11] Patent Number: 4,692,002
[45] Date of Patent: Sep. 8, 1987

[54] HEADBAND ATTACHABLE TO SPECTACLES FRAME STEMS

[75] Inventor: Robert W. Meistrell, Redondo Beach, Calif.

[73] Assignee: Dive N'Surf, Hermosa Beach, Calif.

[21] Appl. No.: 799,175

[22] Filed: Nov. 18, 1985

[51] Int. Cl.⁴ ............................................. G02C 3/00
[52] U.S. Cl. ...................................... 351/156; 351/157
[58] Field of Search ...................... 351/123, 156, 157; 2/452

[56] References Cited

U.S. PATENT DOCUMENTS

| | | |
|---|---|---|
| 1,819,738 | 8/1931 | Daniels . |
| 2,481,946 | 9/1949 | Pendleton . |
| 2,539,922 | 1/1951 | Nyberg . |
| 2,704,961 | 3/1955 | Weil . |
| 3,450,467 | 6/1969 | Phillips . |
| 3,874,776 | 4/1975 | Seron . |
| 3,879,804 | 4/1975 | Lawrence . |
| 4,133,604 | 1/1979 | Fuller . |

OTHER PUBLICATIONS

Madison Dental Co., "Safe T Gard", 1970.

Primary Examiner—Rodney B. Bovernick
Attorney, Agent, or Firm—William W. Haefliger

[57] ABSTRACT

An eye glass frame retainer comprising
(a) an elongated band that is lengthwise stretchable, the band of a length to extend about the back of the wearer's head,
(b) the band having substantially the same width throughout its length, including end portions thereof,
(c) each of said end portions containing a series of lengthwise spaced through perforations sized to stretchably pass an eyeglasses frame stem so as to grip the stem and retain the end portion thereon, when the band is stretched about the wearer's head, exerting endwise force on said band end portions.

9 Claims, 4 Drawing Figures

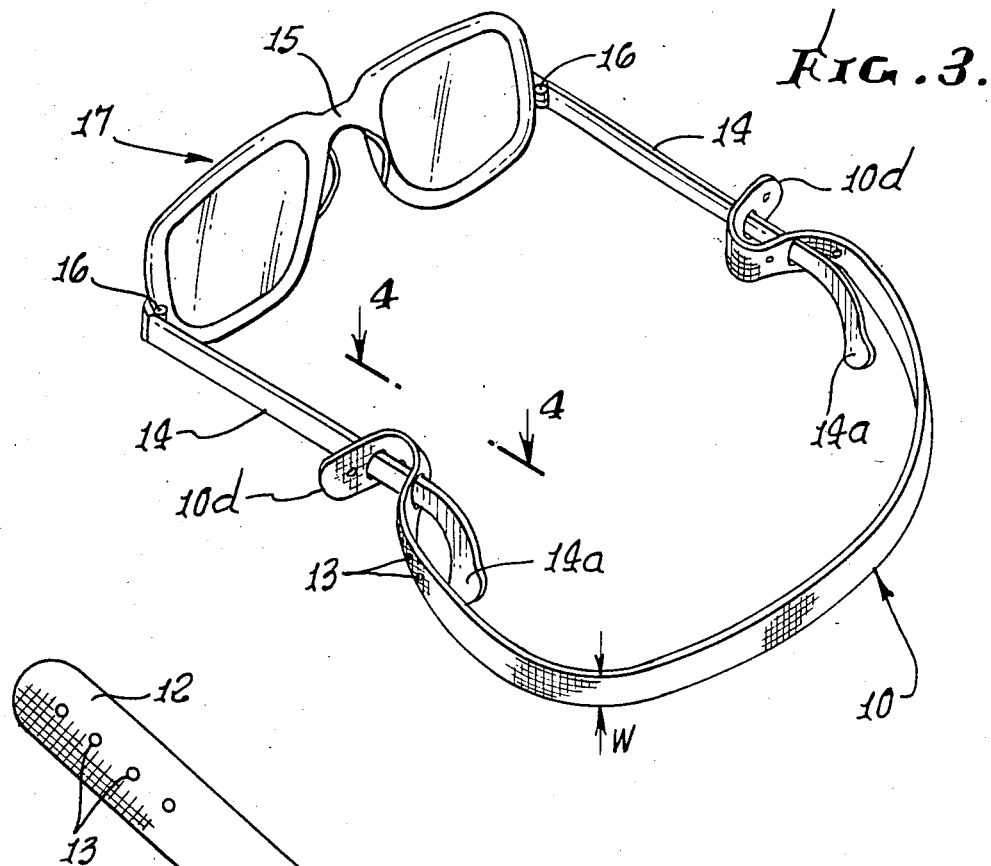
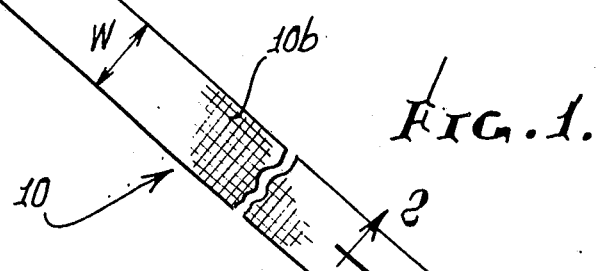
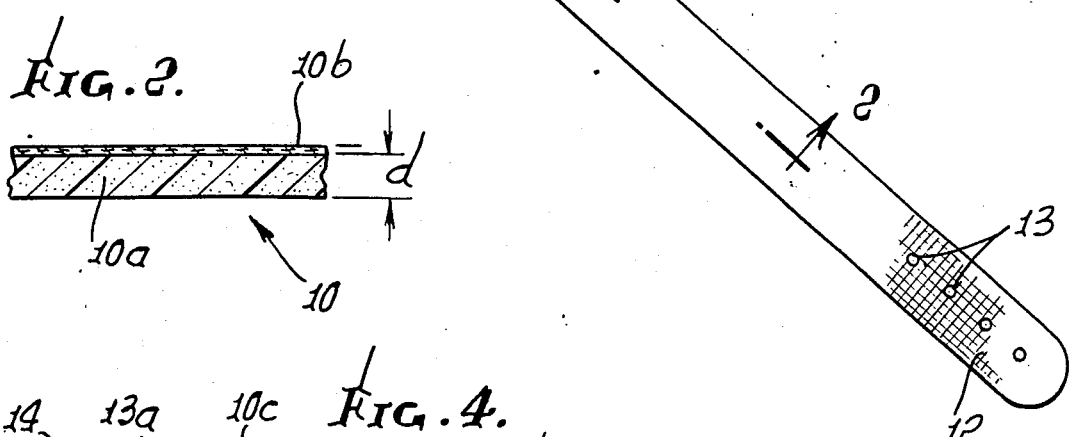
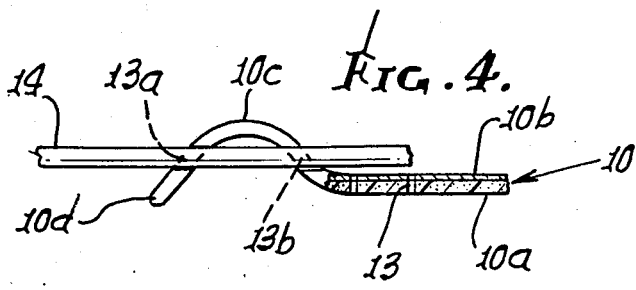

HEADBAND ATTACHABLE TO SPECTACLES FRAME STEMS

BACKGROUND OF THE INVENTION

This invention relates generally to the retention of eyeglass frames to wearers' heads and more particularly to a uniquely simple and effective one-piece retainer easily attached to different size frames, without adjustment.

In the past, various retention devices have been employed, as are exemplified by the following U.S. Pat. Nos.:

4,133,604;
2,704,961;
2,481,946;
3,450,467;
1,819,738;
3,879,804;
3,874,776;
3,502,396.

Such prior devices are either too complex, insufficiently adaptable to different frames, or unreliable. There is need for an improved retainer charactered by low cost, simple one-piece construction, reliability, and capable of self adjustment to frame stems of different types and sizes.

SUMMARY OF THE INVENTION

It is a major object of the invention to provide an improved retainer meeting the above need. Basically, the improved retainer comprises (a) an elongated band that is lengthwise stretchable, the band of a length to extend about the back of the wearer's head, (b) the band having substantially the same width throughout its length, including its end portions, (c) each of the end portions containing a series of lengthwise spaced through perforations sized to stretchably pass an eyeglass grame stem so as to grip the stem and retain the end portion thereon, when the band is stretched about the wearer's head, exerting endwise force on said band end portions.

As will appear, the retainer band, with unusual advantage consists of a layer of elastomeric foam which is lined on one side with a sheet of stretchable fabric, the perforations extending through both said layer and sheet. The band, being stretchable, enables the perforations to be a very small size so as to stretch open when the spectacle's stem is inserted through two perforations, further enabling the band to grip the stem and form a side loop at one side of the stem for resisting endwise movement of the band on the stem. For good stretchability and hole cooperation with the stem, the band width should be substantially uniform and less than about ½ inch.

Further, the perforations typically extend in a row in each end portion, and are spaced apart between ¼ and 1 inch, for optimum gripping of the stems.

These and other objects and advantages of the invention, as well as the details of an illustrative embodiment, will be more fully understood from the following specification and drawings, in which:

DRAWING DESCRIPTION

FIG. 1 is a plan view of a band incorporating the invention;

FIG. 2 is an enlarged fragmentary section taken on lines 2—2 of FIG. 1;

FIG. 3 is a perspective view showing the band applied to a spectacle frame, i.e. its stems; and FIG. 4 is an enlarged plan view on lines 4—4 of FIG. 3.

DETAILED DESCRIPTION

In the drawings, the elongated band 10 is lengthwise stretchable, and is also widthwise stretchable; also it is compressible, in its thickness dimension. It may consist, advantageously of a relatively thick strip 10a of closed cell compressible foam, lined on one side or face with a sheet 10b of compressible fabric. Examples are foamed NEOPERENE (at 10a) and stretchable NYLON (at 10b). The foam has a thickness "d" between about 1/16 and 3/16 inches. The band is about 13–15 inches long, and its width "w" is substantially uniform, being less than about ½ inch.

The band has end portions 12 which extend in the same plane as band extent between such end portions. Each of such end portions contains a series or row of lengthwise spaced through perforations 13, typically of like or near like size, and advantageously about 1/32 inch in diameter. The perforations are sized to stretchably pass eyeglasses frame stems 14 of different sizes, so as not only to readily pass the stem, but also to grip same in order to retain the stem endwise positioned thereon (at selected position along the stem's length), whereby when the band is stretched about the wearer's head, exerting endwise force on the band end portions 12, the band will in turn exert comfortable force on the stems, to thereby comfortably retain the eyeglasses' bridge 15 on the wearer's nose. Note stem connections 16 to the eyeglasses 17. These conditions are met when the band has the composition, configuration and dimensions referred to, and the band further readily adapts to different frame stem sizes (cross-dimensions), yielding great versatility as well as simplicity, and ease of connection onto the stem. Note also that the perforations stretchably pass the rounded and enlarged ends 14a of the stems. The perforations should have cross sectional areas between 1/6 and ½ the cross-sectional areas of the stems, for best results, and should be circular.

In use, the stem is passed through two sequential perforations, as shown in FIGS. 3 and 4 so that the successive perforations become oppositely stretchably angled (see 13a and 13b in FIG. 4) in order better to grip the stem. Note the band bulge 10c thus formed at one side of the stem, and the band free tail ends at 10d. For best grip results, the spacing of the perforations should be between ¼ and ½ inch (preferably about 5/16 inch), and there should be at least four such perforations (preferably 4 to 6) in the row to facilitate adjustment along the stem, as well as penetration of more than two perforations by the stems (for even better gripping), yielding a wavy configuration (close hugging) of the band end portions on and along the stem. In this regard, the stretchable fabric sheet 10b gives the band integrity and strength, as well as greater ability to stretchably grip the stem or stems, at the perforation locations, while allowing relatively forcible initial adjustment sliding of the band along the stem.

In use, the portions of the band placed around the back of the wearer's head, as for example behind the upper extents of the ears, hold the eyeglasses in position under slight band tension; and the band position on the stems is easily adjusted as described above to yield the desired comfortable retention tension.

I claim:

1. An eye-glass frame retainer comprising
   (a) an elongated band that is lengthwise stretchable, the band of a length to extend about the back of the wearer's head,
   (b) the band having substantially the same width throughout its length, including end portions thereof,
   (d) each of said end portions containing a series of lengthwise spaced through perforations sized to stretchably pass an eyeglasses frame stem so as to grip the stem and retain the end portion thereon, when the band is stretched about the wearer's head, exerting endwise force on said band end portions,
   (d) the band consisting of a layer of elastomeric foam which is lined on one side with a sheet of stretchable fabric, all said perforations extending through both said layer and sheet,
   (e) and whereby when the frame having two stems is projected through perforations in said end portions, the perforations stretch open to pass and grip the stems.

2. The retainer of claim 1 wherein the sequential spacing of said perforations is between ¼ and ½ inch.

3. The retainer of claim 2 wherein said perforations have arcuate boundaries.

4. The retainer of claim 3 wherein said perforations are generally circular, and of the same size.

5. The retainer of claim 1 wherein the perforations extend in a row in each end portion, and there are at least four perforations in each row.

6. The retainer of claim 5 wherein said band width is less than about ½ inch throughout its length said length being between 13 and 15 inches.

7. The retainer of claim 1 wherein said sheet consists of foamed NEOPRENE, and said fabric consists of stretchable NYLON.

8. The retainer of claim 1 wherein said foam has a thickness of between 1/16 and 3/16 inches.

9. The retainer of claim 4 wherein the perforations are about 1/32 inch in diameter.

* * * * *